though all of the objects are substantially dry during the processing thereof.

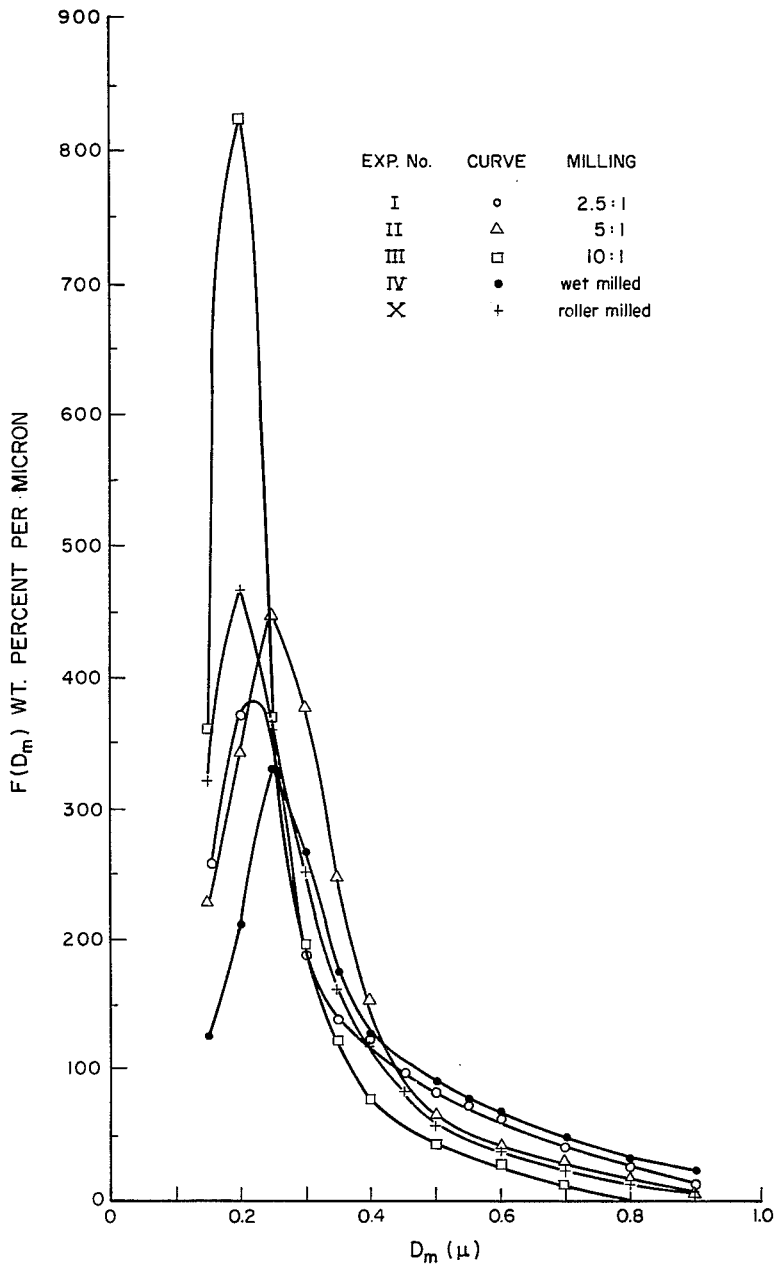

United States Patent Office 3,220,867
Patented Nov. 30, 1965

3,220,867
SULFATE-BASE RUTILE TiO₂ PIGMENT AND METHOD FOR PRODUCING SAME
James M. O'Shaughnessy, Westfield, N.J., assignor to National Lead Company, New York, N.Y., a corporation of New Jersey
Filed Jan. 7, 1963, Ser. No. 249,722
13 Claims. (Cl. 106—300)

The present invention relates in general to the production of pigmentary materials and more especially a sulfate-base rutile $TiO_2$ pigment having optimum pigmentary properties including fineness and uniformity of particle size, high gloss, high tinting strength and superior spectral characteristics.

As is well known in the art, $TiO_2$ pigment is produced to a large extent by the so-called sulfate process wherein a titaniferous iron ore, such as ilmenite, is digested in $H_2SO_4$ to form a digest cake. The latter is dissolved in an aqueous medium to form a sulfate solution which, after clarification and concentration, is hydrolyzed to precipitate an insoluble $TiO_2$ hydrolysate. The hydrolysate comprises $TiO_2$ crystallites of mean size of about 100 A. many of which are clustered together as aggregates. During subsequent calcination of the hydrolysate two types of growth occur, the one being an isothermal growth process wherein the crystallites themselves grow to a certain maximum size depending upon the temperature of calcination; and a sintering growth process wherein the aggregates grow in size without any natural limiting effect. It is generally believed that for a $TiO_2$ pigment to have optimum pigmentary properties it should consist of discrete particles substantially all of which are less than 0.5 micron with at least a major portion in the range from 0.15 to 0.3 micron. Some measure of control can be maintained on the isothermal growth of the crystallites by calcining at certain specific temperatures. Unfortunately however there is no effective control on the growth of the aggregates. Consequently any given calcination will produce a calcined material comprising a relatively small amount of crystallites of optimum pigmentary size and a much larger amount of relatively large aggregates.

These sintered aggregates, which may vary from 1.0 to 10.0 microns in size have a large void volume and hence high oil absorption and, when included in a coating composition, produce a paint film having low gloss, low hiding power and poor spectral characteristics. As a consequence it has been the long standing practice of pigment manufacturers to grind and/or mill the calcined pigmentary material in an effort to produce a final product having good pigmentary properties.

Almost without exception the grinding and milling techniques now used entail the use of wet milling and hydroseparation. However the efficiency of wet milling and hydroseparation in the particle size range of less than one micron is extremely poor and the product of even the most severe wet-milling operation contains large quantities of aggregated particles, which contribute to high oil absorption and low hiding power. Dry grinding of the pigment has been provided usually at a later stage of production to reduce the oil absorption and improve the tinting strength of the pigment. However while subsequent dry grinding enhances certain pigmentary properties it impairs others, such as ease of dispersion in water or other paint vehicles. Also it produces products which agglomerate upon storage or shipment. Furthermore a wet milling operation, which is invariably followed by hydroseparation and drying is costly, time consuming, and requires relatively complex equipment.

It has now been discovered that by employing a unique dry milling technique in combination with treatment with hydrous metal oxides a superior sulfate-base rutile $TiO_2$ pigment can be produced having high gloss, high tinting strength, superior ease of dispersion in paint vehicles and water systems, and other desirable pigmentary characteristics.

It is an object, therefore, of this invention to provide a superior sulfate-base rutile titanium dioxide pigment which is readily dispersible in water or other paint vehicles and which has high gloss, high tinting strength and optimum spectral characteristics. A further object of the invention is to provide a novel dry milling and treating process for $TiO_2$ calciner discharge for producing a finished sulfate-base rutile titanium dioxide pigment having superior pigmentary properties.

Other objects, features and advantages of the invention will be apparent from the description and claims which follow.

In its broadest aspects the invention by which the aforesaid objects are accomplished comprises a unique combination of steps consisting of dry milling an unmilled, calcined, sulfate-base rutile $TiO_2$ pigment material, sometimes referred to hereinafter as $TiO_2$ calciner discharge, at milling intensities sufficiently high to reduce the calcined material to uniformly fine, discrete particles within a critical size range; treating the milled calciner discharge with hydrous metal oxides, and then subjecting the treated pigment to a second intense dry milling. More particularly the invention comprises subjecting substantially dry, sulfate-base rutile $TiO_2$ calciner discharge to a dry milling step of sufficient intensity to reduce the sintered material to uniformly fine, discrete particles characterized by a weight mean size at most no greater than about 0.33 micron with a standard deviation of distribution at most no greater than about 0.17 micron, treating the milled pigment in the absence of wet milling and hydroseparation with soluble salts of metals selected from the group consisting of titanium, aluminum, silicon and mixtures thereof to form the corresponding insoluble metal oxides on the milled pigment and then subjecting the treated pigment to a final intense dry milling. Preferably at least 70% to about 90% of the particles are in the size range from .15 to .3 micron.

It is noteworthy that heretofore the milling of pigmentary $TiO_2$ has been done almost exclusively by a complex system of wet milling, hydroseparation and one or more dry millings. The intensity of the latter has been, of necessity, limited because of the tendency of severe milling at this stage to form agglomerated lumps of primary pigment particles, which detract from the hiding power dispersion and gloss of paints made from such products. Hence it is surprising and wholly unexpected to discover that a sulfate-base rutile $TiO_2$ pigment having optimum pigmentary properties can be produced without wet milling and hydroseparation provided the $TiO_2$ calciner discharge is first subjected to dry milling, of the intensity hereinafter described, accompanied or immediately followed by treatment of the milled pigment with a metal oxide and an intense final dry milling.

The exact reason for this unexpected result is not fully understood. However it is postulated that whereas heretofore pigment milling systems have achieved a modicum of success in breaking down sintered aggregates by wet milling and hydroseparation, followed by a final dry milling, the effect has been temporary due to the fact that the freshly exposed surfaces of the finely milled pigment, which, in effect become molecular active sites, are left exposed and hence cause the milled pigment to reagglomerate, when added to a paint medium, by reason of the relatively strong molecular forces of these exposed sites. In contradistinction by dry milling the calciner discharge intensely, followed immediately by treatment with one or more soluble salts of titanium, silicon or aluminum and a final intense dry milling, the sintered aggregates of the calciner discharge are not only reduced to optimum pigmentary particle size and distribution but, due to the coating of hydrous metal oxides on the exposed molecular sites of the freshly ground calciner discharge the strong molecular forces of attraction of the latter are minimized and any reagglomeration that takes place is due to the relatively weak forces of adhesion of the metal oxide coatings. These relatively weak forces can be disrupted easily by the final intense dry milling and as a result the finished pigment consists of discrete particles of optimum pigmentary particle size which are readily dispersible in water or other paint vehicles to form a paint having high gloss, high tinting strength and excellent spectral characteristics.

It is noteworthy that whereas previous grinding techniques have improved certain properties of a pigmentt, the improvement in one property has been to the detriment of other properties whereas the process of the present invention produces a sulfate-base rutile $TiO_2$ pigment which is superior to earlier gades of $TiO_2$ pigment in all of those properties commonly used to evaluate a pigment.

As mentioned above one of the critical steps in the unique combination of steps which characterize the process of this invention is the intense dry milling of the $TiO_2$ calciner discharge. For purposes of definition the phrase "intense dry milling" and related expressions shall be understood to mean that the pigmentary $TiO_2$ and in particular the $TiO_2$ calciner discharge is milled at least until the weight mean size of all the particles is no greater than about 0.33 micron and the standard deviation of distribution is no greater than about 0.17 micron as determined in the manner described below.

With reference to the milling intensities used, the drawing shows graphically, relative milling intensities in terms of weight percent per micron F $(Dm)$ plotted against mean diameter $(Dm)$ for the micropulverized untreated calciner discharge of Examples I–IV and X given below. By using standard distribution equations the weight mean size $(d_w)$ and the standard deviation of distribution $(\sigma)$ can be computed for the respective dry milled calciner discharges.

The particular dry milling technique used is not a determinant as long as it is capable of producing the intensity of milling set out above. Roller milling, fluid energy mills, etc. may be used but the preferred type of dry mill is a steam micronizer. When using this type of dry mill the intensity of milling, expressed in terms of pounds of steam to pounds of $TiO_2$ pigment, required to effect the minimum milling intensity defined above is of the order of 2.5:1. It is desirable however to mill at even greater intensities which may be done by operating at higher steam to pigment ratios as for example 5:1 and preferably as high as 10:1. Referring to Table I below it will be seen that calciner discharges, dry milled at intensities ranging from a minimum steam to pigment ratio of 2.5:1 to a steam to pigment ratio of as high as 10:1 have particle sizes characterized by a weight mean size $(d_w)$ in the range from a maximum of 0.33 with a standard deviation of distribution of 0.17 to a minimum of 0.26 with a standard deviation of distribution of 0.12. On the other hand a pigment produced by conventional wet milling, as in Example IV, has a weight mean size as high as 0.37 and a standard deviation of distribution as high as 0.18.

TABLE I.—PARTICLE SIZE DISTRIBUTION OF CALCINER DISCHARGE

| Examples | I | II | III | IV | X |
|---|---|---|---|---|---|
| Wt. mean size $d_w$ (microns) | 0.33 | 0.31 | 0.26 | 0.37 | 0.29 |
| Std. deviation of distribution $\sigma$ (microns) | 0.17 | 0.14 | 0.12 | 0.18 | 0.15 |

In general the process of the instant invention is practiced by feeding substantially dry sulfate-base $TiO_2$ calciner discharge to a dry mill, as for example a steam micronizer, in which it is subjected to dry milling of the intenisty defined above. Immediately following milling the calciner discharge is slurried in water and to the slurry is added a treating agent selected from the group consisting of the soluble salts of titanium, aluminum, silicon and mixtures thereof, followed by adjusting the pH to about 7.2 to precipitate the soluble salts as hydrous metal oxides on the pigment. The slurry is then filtered and the residual filter cake washed, dried and given an intense final dry milling to produce a finished $TiO_2$ pigment.

As will be illustrated by the examples below while the intense dry milling of the calciner discharge is critical to the formation of discrete particles of optimum particle size distribution, this alone will not suffice to produce the superior pigment of this invention. It has been discovered that it is also necessary to coat the intensely ground calciner discharge with hydrous metal oxides before subjecting it to a final intense dry milling. As a result the finished pigment will have pigmentary properties superior to an untreated pigment of the same particle size distribution.

In order to illustrate the invention further the following examples are given of runs that were made on a pilot plant scale using various milling techniques and milling intensities.

*Example 1*

Sulfate-base $TiO_2$ calciner discharge of the rutile modification, prepared by a process well known in the art, was fed to a steam micronizer at the rate of 600 lbs. per hour in which superheated steam was introduced at 385° F. and circulated at a ring pressure of 90 pounds per square inch gauge, the total steam flow through feed injector and ring being 1490 pounds per hour. The intensity of milling in terms of the weight ratio of steam to $TiO_2$ was 2.5:1. The milled calciner discharge was tested for particle size in the manner described below (see curve I in FIGURE I), and was calculated to have a weight means size $(d_w)$ of 0.33 micron and a standard deviation of distribution $(\sigma)$ of only 0.17 micron.

The dry milled caciner discharge was then slurried with water, heated to 50° C. and then treated with 1.0% $TiO_2$ as titanyl sulfate $(TiOSO_4)$, at a concentration of approximately 110 g.p.l. $TiO_2$; and 3.0% $Al_2O_3$ as sodium aluminate $(NaAlO_2)$, at a concentration of 490 g.p.l. $Al_2O_3$, allowing a half hour retention period between the addition of the treating agents and a final retention time of 3 hours. The pH of the treated slurry was then adjusted by the addition of 20% $H_2SO_4$ to provide a hydrous metal oxide coated pigment slurry having a pH from 7.3 to 7.7. The treated and neutralized slurry was then filtered and washed to less than 20 p.p.m. $Na_2O$ in the filtrate and dried. The dried pigment was then steam micronized at a 5:1 steam to pigment ratio. The finished pigment consisted of discrete particles 70% of which were in the range from 0.15 to 0.3 micron with only 3% at 0.5 micron or above.

As shown in Table II the sulfate-base hydrous metal oxide coated rutile pigment made by the process outlined above had a Dutch Boy-990 tinting strength of 1778, an alkyd black tinting strength of 1870, an 80:20 gloss of 68, a finess of grind of 6.75 and a spectral characteristic rating of 2.7.

*Examples II and III*

Additional runs were made using the same calciner discharge but dry milling at intensities of 5:1 and 10:1 respectively. The intensity of milling, in terms of particle size, is shown in FIGURE 1, the weight mean sizes being calculated as 0.31 and 0.26 respectively; and the standard deviation distributions being calculated as 0.14 and 0.12 respectively. The milled calciner discharges were then coated with the hydrous oxides of titanium and aluminum, in the manner of Example I, and given a final milling at a steam to pigment ratio of 5:1. As shown in Table II, in each instance the pigment consisted of discrete particles at least 78% of which were in the range from 0.15 to 0.3 micron with a maximum of only 2% at 0.5 micron or above.

Each pigment was tested for tinting strength, gloss, fineness of grind and spectral characteristics in the manner described below. The results are shown in Table II in which it can be seen that each pigment has progressively better pigmentary properties than the pigment of Example I.

*Example IV*

To illustrate one of the wet milling techniques used hereintofore in the industry calciner discharge, similar to that used in Example I, but not dry milled, was wet milled by forming a slurry of the pigment in water at a solid concentration of approximately 25% by weight to which was added enough NaOH to raise the pH of the slurry to 9.2 to 9.4.

Wet milling was performed in a Porox-lined ball mill having a flint-stone grinding media. Following the wet milling the milled slurry was classified in a Dorr Clone classifier. A sample of the classified $TiO_2$ pigment was taken for particle size analysis and the particles were calculated to have a weight mean size of $0.37\mu$ and a standard deviation of distribution of 0.18.

The wet milled and classified $TiO_2$ was then treated with 1.0% $TiO_2$ as titanyl sulfate, and 3.0% $Al_2O_3$ a sodium aluminate, as described in Example I, after which it was washed, dried and then dry milled in a steam micronizer at an intensity corresponding to a steam to pigment ratio of 5:1. As shown in Table II only 66% of the particles were in the range from 0.15 to 0.3 micron with as high as 5% at 0.5 or above. The finished pigment was tested for its pigmentary properties in the manner hereinafter described. As will be seen from the figures given in Table II the tinting strength, gloss and fineness of grind are all less than those of a pigment produced in accordance with the dry grinding processes described in Examples I, II and III.

*Example V*

An additional sample pigment was prepared similar to that of Example IV, i.e. by wet milling the calciner discharge followed by treatment with the hydrous oxides of titanium and aluminum, drying and dry milling. In this instance, however, the final dry milling was unusually intense and consisted of two successive runs each at a steam to pigment ratio of 7.5:1 for a total intensity of 15:1.

As shown in Table II the particle size distribution was exceptionally poor with only 57% in the range from 0.5 to 0.3 micron and 3% at 0.5 micron or above. While tinting strength and gloss are high it will be seen, from Table II, that oil absorption is low and that fineness of grind is so very low that it would be extremely difficult to mix the pigment in a paint vehicle.

*Examples VI–VIII*

To illustrate the significance of the metal oxide treatment used on the dry milled calciner discharge of Examples I–III identical samples of dry milled calciner discharge were prepared at dry milling intensities of 2.5:1, 5:1 and 10:1. These dry milled pigments were then repulped in water to approximately 22–25% $TiO_2$, coagulated with $MgSO_4$ after which the pH of the slurry was adjusted to 7.2–7.4 with 50% $H_2SO_4$. The slurries were then filtered, washed and dried after which they were subjected, without treatment, to final dry milling at an intensity of 5:1 steam to pigment ratio. As shown in Table II despite good particle size distribution in every instance the pigments had very low tinting strength values, low gloss, low spectral characteristics and extremely poor fineness of grind.

*Example IX*

The pigment of Example IX was prepared by dry milling the calciner discharge at a steam to pigment ratio of 2.5:1 followed by wet milling, as in Example IV, drying, and a final dry milling at a steam to pigment ratio of 5:1. No hydrous metal oxide treatment was used.

As shown in Table II the resulting pigment had only fair particle size distribution, poor tinting strength values, very low gloss, poor spectral characteristics and exceptionally low fineness of grind.

*Example X*

As pointed out about while the criterion of success in the process of the instant invention is the intensity of dry milling of the calciner discharge in combination with treatment with hydrous metal oxides, and final dry milling the particular dry milling technique used is not determinative. In the instant example a sample pigment was prepared by dry milling a calciner discharge like that used in Example I, in a roller mill. The intensity of milling was at the rate of 20 tons per day using a standard Raymond mill with whizzer blades rotating at 500 r.p.m. The initial dry milling of the calciner discharge was followed by treatment and final dry milling as done in Example I. As shown in Table II the finished pigment had particle size distribution comparable to Example I, excellent tinting strength values, very high gloss, good spectral characteristics and acceptable fineness of grind.

TABLE II.—PIGMENTARY PROPERTIES AND PARTICLES SIZE DISTRIBUTION OF FINISHED PIGMENTS

| Exp. No. | Fineness of grind, pony mix | Alkyd Black | | Dutch Boy-990, T.S. | Gloss 80:20 | Particle Size 0.15-0.3 | Distribution (percent) 0.5+ |
|---|---|---|---|---|---|---|---|
| | | T.S. | SCx | | | | |
| I | 6.75 | 1870 | 2.7 | 1778 | 68 | 70 | 3 |
| II | 6.50 | 1905 | 2.8 | 1800 | 69 | 79 | 2 |
| III | 6.75 | 1910 | 3.1 | 1820 | 69 | 78 | 1 |
| IV | 5.50 | 1760 | 2.5 | 1755 | 62 | 66 | 5 |
| V | 1.50 | 1920 | 2.7 | 1820 | 70 | 57 | 3 |
| VI | 2.0 | 1590 | 1.4 | 1703 | 21 | 82 | 4 |
| VII | 0.0 | 1625 | 1.4 | 1708 | 25 | 76 | 2 |
| VIII | 1.0 | 1615 | 1.4 | 1723 | 23 | 88 | 1 |
| IX | 1.0 | 1585 | 1.3 | 1718 | 23 | 70 | 2 |
| X | 4.0 | 1920 | 2.7 | 1800 | 70 | 71 | 1 |

The tests used in evaluating the pigmentary properties of the several samples of pigment produced in accordance with the above examples are as follows:

FINENESS OF GRIND

To determine the fineness of grind of a given pigment 500 grams of the pigment are mixed with 194.5 grams of an alkyd vehicle (Syntex–40) in a pony mixer for 8 minutes. 63.5 grams additional Syntex–40 are then added and the mixing is continued for an additional 2 minutes. Then 60.6 grams of the paste are removed and put in a ¼ pint can to which are added 36.3 grams Syntex–40 and 24 milliliters mineral spirits. The mix is shaken for 10 minutes in a Red Devil shaker. The fineness of grind test is then made using the Hegman Grind Gauge as described by D. Doubleday and A. Barkman in Paint, Oil and Chemistry Review, June 22, 1950. In this test the higher the number the finer the particle size and the easier the pigment will wet when stirred in a paint vehicle, the highest number for all practical purposes being 7.5.

TINTING STRENGHT

The tinting strengths of the sample pigments were determined by two tests the one being known as the alkyd black test and the other as Dutch Boy–990.

The alkyd black test is carried out by preparing a test panel of the pigment to be tested by adding 0.1 gram carbon black to 5.0 grams pigment and milling the mixture with magnesia oil and glyptal to form a test paint. The test paint is applied to panels and reflectance measurements are made with a Colormaster Differential Colorimeters as described by P. B. Mitton and A. E. Jacobsen in Official Digest, vol. 34, 1962, pages 704–715, using a standard white paint for comparative purposes. The reflectance readings using the green filter are taken as a measure of tinting strength while the reflectivity of the blue minus red filters is referred to as the undertone or spectral characteristics.

The Dutch Boy-990 test is made by mixing 25 grams pigment with 11.6 grams alkyd (Aroplaz 1248) in a beaker then running the mix through a 3 roller paint mill. 20 grams of the mix are added to a ¼ pint can to which is added 26.5 grams Dutch Boy-990 composite consisting of:

| | Grams |
|---|---|
| Dutch Boy-990 | 0.341 |
| Aroplaz 1248 | 20.40 |
| Mineral spirits | 5.02 |
| 24% Pb drier | 0.48 |
| 6% Co drier | 0.20 |
| Exkin No. 1 (antiskin) | 0.05 | and the mixture shaken for 10 minutes after which it is rolled for ½ hour and then drawn down to 0.002" thickness on test panel and dried.

The reflectance of the test panel is then measured with a Colormaster Differential Colorimeter, see reference above, for its comparative tinting strength value.

GLOSS TEST

The samples were also tested for gloss which in brief is carried out by preparing a baking enamel by milling a hand-mixed pigment paste consisting of 65 grams of pigment and 35 grams of Rezyl 92–5, through a 3 roller paint mill and adding vehicle and thinner to a given weight of the milled paste. A test panel is prepared by dipping the panel in the enamel and air drying the film briefly, followed by baking. When cool the gloss is determined with a 20° glossmeter.

TEST FOR PARTICLE SIZE OF DRY MILLED CALCINER DISCHARGE

As mentioned above the intensity of dry milling is defined in terms of particle size of the dry milled calciner discharge which is determined as follows:

Samples of $TiO_2$ calciner discharge were prepared for centrifugal sedimentation measurements by hand mixing 20 grams of each sample (using beaker and spatula) with 12 grams of 40% solution, by weight, of Acryloid B-72 (Rohm and Haas) in Cellosolve acetate (Union Carbide). The mixture was passed through a laboratory 3-roll paint mill with the rolls at contact setting followed by dilution to 3% $TiO_2$, by weight, by addition of Cellosolve acetate. Particle size analyses were then obtained by centrifugal sedimentation using the procedure described by Jacobsen and Sullivan (1,2) to obtain the cumulative weight percent curves $$\int_0^{Dm} F(D)d(D) \text{ versus } Dm$$

and by graphical differentiation of these curves, the distribution function F (D$m$) was computed for each sample and plotted against D$m$ as shown in FIG. 1.

The weight mean size ($d_w$) and the standard deviation ($\sigma$) of distribution were then calculated from these curves using standard equations as described by Herdum, G., "Small Particle Statistics," pages 23–24 Elsevier, Amsterdam, Houston, New York, Paris (1953).

(1) Jacobsen, A. E., and Sullivan, W. F.: "Centrifugal Sedimentation Method for Particle Size Distribution," Ind. Eng. Chemistry Analytical Edition; 18, 360–364 (1946).

(2) Sullivan W. F., and Jacobsen, A.E.: "Sedimentation Procedure for Determining Particle Size Distribution," American Society for Testing Materials Technical Publication No. 234, pages 98–116, ASTM, Philadelphia, Pa. (1959).

While the foregoing experiments were run using dry milled sulfate-base $TiO_2$ material calcined at about 920° C. and treated with the water soluble salts of titanium and aluminum in amounts of 1.0% and 3.0% respectively to form the corresponding hydrous metal oxides on the pigment it will be understood that these amounts may be varied to some degree and that equally beneficial results may be achieved using these treating agents in conjunction with a silicon salt. Thus for example the soluble salt of titanium may vary in amounts from none to 2.5% as $TiO_2$ on a $TiO_2$ weight basis; the aluminum salt from none to as high as 4.0% as $Al_2O_3$ on a $TiO_2$ weight basis and the silicon salt from about none to 2.5% as $SiO_2$ on a $TiO_2$ weight basis; provided however that the total hydrous oxide addition be not less than 1.0%. When the soluble metal salts of both titanium and aluminum are used they are used in quantities to provide from 0.5% to 2.5% hydrous $TiO_2$ and from 1.5% to 3.5% hydrous $Al_2O_3$ on the dry milled calciner discharge.

From the foregoing experiments it will be seen that whereas prior art milling techniques such as wet milling and hydroseparation of calciner discharge followed by treatment with hydrous metal oxides and a final dry milling (Examples IV and V); or an initial intense dry milling of calciner discharge without subsequent treatment followed by a final dry milling (Examples VI–VIII); or an intense dry milling of calciner discharge followed by wet milling and hydroclassification but no treatment and a final dry milling (Example IX), may produce a finished pigment having improvements in one or two pigmentary properties they will invariably impair one or more of the other desirable properties. However, the new and unique combination of steps which characterize the instant invention, as described herein and defined in the claims which follow, effect improvements in all of the pigmentary properties of the sulfate-base pigment and especially outstanding superiority in tinting strength, gloss, fineness of grind and spectral characteristics.

To recapitulate, the instant invention relates to the production of a superior sulfate-base rutile $TiO_2$ pigment by a process which is relatively simple and economical and characterized by an intense dry milling of a sulfate-base $TiO_2$ calciner discharge such that the latter comprises discrete particles having a weight mean size at most no greater than 0.33 micron with a standard deviation of distribution at most no greater than 0.17 micron; followed by treatment, in the absence of wet milling, with one or more hydrous metal oxides of aluminum, titanium and silicon and a final intense dry milling. The finished sulfate-base rutile $TiO_2$ pigment is superior to all prior art sulfate-base $TiO_2$ pigments in tinting strength, gloss, fineness of grind and spectral characteristics.

I claim:

1. In a process for producing a sulfate-base rutile $TiO_2$ pigment wherein a $TiO_2$ hydrolysate produced by a sulfate process is dried, calcined and milled the improvement which comprises: feeding the sulfate-base $TiO_2$ calciner discharge to a dry mill, dry milling said $TiO_2$ calciner discharge with sufficient intensity such that the dry milled calciner discharge comprises discrete particles having a weight mean size no greater than about 0.33 micron and a standard deviation of distribution no greater than about 0.17 micron, slurrying said milled calciner discharge in an aqueous medium with soluble salts of metals selected from the group consisting of titanium, aluminum, silicon and mixtures thereof in an amount not less than 1% as the hydrous metal oxide on a $TiO_2$ weight basis, adjusting the pH of said aqueous slurry to form and precipitate the corresponding hydrous metal oxides on said dry milled calciner discharge and intensely dry milling the hydrous metal oxide coated calciner discharge.

2. In a process for producing a sulfate-base rutile $TiO_2$ pigment wherein a $TiO_2$ hydrolysate produced by a sulfate process is dried, calcined and milled, the improvement which comprises, feeding the sulfate-base $TiO_2$ calciner discharge to a dry mill, dry milling said $TiO_2$ calciner discharge with sufficient intensity such that the dry milled calciner discharge comprises discrete particles having a weight mean size within the range of from about 0.33 micron with a standard deviation of distribution of about 0.17 micron, to a weight mean size of about 0.26 micron, with a standard deviation of distribution of about 0.12 micron, slurrying said milled calciner discharge in an aqueous medium with soluble salts of metals selected from the group consisting of titanium, aluminum, silicon and mixtures thereof in an amount not less than 1% as the hydrous metal oxide on a $TiO_2$ weight basis, adjusting the pH of said aqueous medium to form and precipitate the corresponding hydrous metal oxides on said dry milled calciner discharge and intensely dry milling the hydrous metal oxide coated calciner discharge.

3. In a process for producing a sulfate-base rutile $TiO_2$ pigment according to the improvement defined in claim 2 wherein said hydrous metal oxide coated calciner discharge is dry milled with an intensity at least equal to the minimum intensity used in dry milling the untreated calciner discharge.

4. In a process for producing a sulfate-base rutile $TiO_2$ pigment according to the improvement defined in claim 2 wherein the dry milled $TiO_2$ calciner discharge is slurried with soluble salts of metal selected from the group consisting of titanium, aluminum, silicon and mixtures thereof to form the corresponding hydrous metal oxides on said calciner discharge said salts being added in amounts to provide, respectively, from none to 2.5% hydrous $TiO_2$, from none to 4.0% hydrous $Al_2O_3$ and from none to 2.5% hydrous $SiO_2$ on said dry milled calciner discharge on a $TiO_2$ weight basis provided however that the total hydrous oxide addition is not less than about 1.0%.

5. In a process for producing a sulfate-base rutile $TiO_2$ pigment according to the improvement defined in claim 2 wherein the dry milled $TiO_2$ calciner discharge is slurried with the soluble metal salts of titanium and aluminum to form the corresponding hydrous metal oxides on said calciner discharge, said salts being added in amounts to provide from 0.5% to 2.5% hydrous $TiO_2$ and from 1.5% to 3.5% hydrous $Al_2O_3$ on said dry milled calciner discharge on a $TiO_2$ weight basis.

6. A process for producing a sulfate-base rutile $TiO_2$ pigment having superior pigmentary properties comprising in combination the steps of: calcining a $TiO_2$ hydrolysate produced by a sulfate process to produce a $TiO_2$ calciner discharge, feeding said $TiO_2$ calciner discharge to a steam micronizer, dry milling said $TiO_2$ calciner discharge in said steam micronizer initially at a steam to pigment ratio of at least 2.5:1 to produce discrete particles having a weight mean size no greater than about 0.33 micron and a standard deviation of distribution no greater than about 0.17 micron, slurrying the initially dry milled calciner discharge in an aqueous medium and admixing said aqueous slurry in the absence of wet milling and hydroseparation, with the soluble salts of metals selected from the group consisting of titanium, aluminum, silicon and mixtures thereof in an amount not less than 1% as the hydrous metal oxide on a $TiO_2$ weight basis, adjusting the pH of said admixture to form and precipitate the corresponding hydrous metal oxides on the initially dry milled $TiO_2$ calciner discharge and subsequently subjecting the treated calciner discharge to a final dry milling in a steam micronizer at a steam to pigment ratio of 5:1.

7. A process for producing a sulfate-base rutile $TiO_2$ pigment having superior pigmentary properties comprising in combination the steps of: calcining $TiO_2$ hydrolysate produced by a sulfate process to produce a $TiO_2$ calciner discharge, feeding said $TiO_2$ calciner discharge to a steam micronizer, dry milling said $TiO_2$ calciner discharge in said steam micronizer initially at a steam to pigment ratio in the range of from 2.5:1 to 10:1 to produce discrete particles having a weight mean size within the range of from about 0.33 micron, with a standard deviation of distribution of about 0.17 micron, to a weight mean size of about 0.26 micron, with a standard deviation of distribution of about 0.12 micron, slurrying said initially dry milled $TiO_2$ calciner discharge in an aqueous medium and admixing said aqueous slurry with soluble salts of metals selected from the group consisting of titanium, aluminum, silicon and mixtures thereof in an amount not less than 1% as the hydrous metal oxide on a $TiO_2$ weight basis, adjusting the pH of said admixture to form and precipitate the corresponding hydrous metal oxides on said initially dry milled calciner discharge and subsequently dry milling the hydrous metal oxide coated calciner discharge, said subsequent dry milling being done at an intensity at least equal to the minimum intensity of said initial dry milling.

8. A process for producing a sulfate-base rutile $TiO_2$ pigment according to claim 7 wherein the initially dry milled $TiO_2$ calciner discharge is slurried in an aqueous medium with soluble salts of metals selected from the group consisting of titanium, aluminum, silicon and mixtures thereof to form the corresponding hydrous metal oxides on said calciner discharge, said salts being added in amounts to provide respectively, from none to 2.5% hydrous $TiO_2$, from none to 4.0% hydrous $Al_2O_3$ and from none to 2.5% hydrous $SiO_2$ on said initially dry milled calciner discharge on a $TiO_2$ weight basis, provided however that the total hydrous oxide addition is not less than 1%.

9. A process for producing a sulfate-base rutile $TiO_2$ pigment according to claim 7 wherein the milled $TiO_2$ calciner discharge is slurried in an aqueous medium with the soluble salts of titanium and aluminum to form the corresponding hydrous metal oxides on said calciner discharge, said salts being added in amounts to provide from 0.5% to 2.5% hydrous $TiO_2$ and from 1.5% to 3.5% hydrous $Al_2O_3$ on said initially dry milled calciner discharge on a $TiO_2$ weight basis.

10. A sulfate-base rutile $TiO_2$ pigment characterized by discrete particles at least 70% of which are in the size range from 0.15 to 0.3 micron with a maximum of about 3% at 0.5 micron and above, said discrete particles having an hydrous metal oxide coating thereon selected from the group consisting of the hydrous oxides of aluminum, titanium, silicon and mixtures thereof in an amount not less than 1% on a $TiO_2$ weight basis.

11. A sulfate-base rutile $TiO_2$ pigment characterized by discrete particles having a particle size distribution such that from at least 70% to about 90% of the particles are in the size range from 0.15 to 0.3 micron with a maximum of about 3% at 0.5 micron and above, said discrete particles having a coating thereon of the hydrous oxides of titanium and aluminum in an amount not less than 1% on a $TiO_2$ weight basis.

12. A sulfate-base rutile $TiO_2$ calciner discharge characterized by discrete particles having a weight mean size no greater than about 0.33 micron and a standard deviation of distribution no greater than about 0.17 micron.

13. An untreated milled sulfate-base rutile $TiO_2$ calciner discharge characterized by discrete particles having a weight mean size within the range of from about 0.33 micron with a standard deviation of distribution of about 0.17 to a weight mean size of about 0.26 micron with a standard deviation of distribution of about 0.12 micron.

References Cited by the Examiner
UNITED STATES PATENTS

| | | | |
|---|---|---|---|
| 2,218,704 | 10/1940 | Erskine | 106—300 |
| 2,671,031 | 3/1954 | Whately | 106—300 |
| 3,035,966 | 5/1962 | Siuta | 106—300 |
| 3,086,877 | 4/1963 | Sheehan et al. | 106—300 |

TOBIAS E. LEVOW, *Primary Examiner.*